(12) United States Patent
Schopf, Jr.

(10) Patent No.: US 7,390,340 B1
(45) Date of Patent: Jun. 24, 2008

(54) FILTRATION APPARATUS

(76) Inventor: Robert W. Schopf, Jr., 4700 Watson Dr., Doylestown, PA (US) 18901

( * ) Notice: Subject to any disclaimer, the term of this patent is extended or adjusted under 35 U.S.C. 154(b) by 529 days.

(21) Appl. No.: 11/119,254

(22) Filed: Apr. 29, 2005

(51) Int. Cl.
*B01D 46/00* (2006.01)

(52) U.S. Cl. .......... 55/350.1; 55/385.1; 55/410; 55/417; 55/418; 55/484; 96/421

(58) Field of Classification Search .......... 55/312, 55/350.1, 385.1, 410, 417, 418, 484, 503; 96/421

See application file for complete search history.

(56) References Cited

U.S. PATENT DOCUMENTS 5,085,049 A * 2/1992 Rim et al. ............ 60/274
6,090,187 A * 7/2000 Kumagai ............ 95/278

* cited by examiner

*Primary Examiner*—Robert A Hopkins
(74) *Attorney, Agent, or Firm*—John Lezdey & Assoc

(57) ABSTRACT

A filtration apparatus for use in a system containing a gas or vapor to be cleaned. The apparatus has at least one housing for a filter that removes contaminants from a gas or vapor. The housing contains an inlet portion and an outlet portion in association with valves for closing or regulating the flow of gas or vapors to be cleaned by the filter. A differential pressure gauge is optionally provided to monitor the pressure in the housing and to indicate when the filter should be replaced. One or more housings can be used for the apparatus.

7 Claims, 1 Drawing Sheet

FILTRATION APPARATUS

FIELD OF THE INVENTION

The present invention relates to a fluid filtering device. More particularly, the filtering device filters undesirable chemicals, particles, hydrocarbons, pathogens and the like from gases, vapors and the like which can be easily maintained.

BACKGROUND OF THE INVENTION

It is not only desirable to protect the environment from debris, particulates, contaminants, biologics, bacteria, chemicals and other airborne material which are produced in industrial plants but to provide similar protection in systems which have a fluid flow that are used in hospital anesthesia systems, plumbing and combustion equipment such as boilers, incinerators and chimneys.

Filtration devices in a plumbing system are used for the soil vent stack. However, the prior art devices are difficult to install in existing system and once installed are difficult to maintain.

Hospitals utilize a central location for gases used in delivery to patients in their rooms or in the operating rooms. A problem recognized in hospitals is that contaminants such as mold or pathogens are capable of growth in the delivery systems and require frequent inspection and cleaning. Such operation is not efficient and is costly. New Jersey at the present time is the only state which requires maintenance of any gas delivery system. It would be desirable to provide a system which can be easily installed that filters any undesirable matter found in the oxygen or anesthesia systems.

Any industrial operation involving the generation of dust, smoke and other forms of particulate matter or biologics entrained in a gas or the generation of noxious gases mixed with harmless gases that are discharged into the atmosphere should provide for removal of the objectionable materials to the greatest possible extent before the gas is discharged. This invention relates to a filter system and/or arrangement that allow more efficient and reliable operation, permits more effective maintenance of the equipment, and also frequently provides installation of the equipment at a significantly lower cost, than have been possible with systems and arrangements previously proposed or used.

One problem with previously proposed multiple unit equipment is that the gas flow distribution frequently is not uniform either among the units or within the individual units themselves. As a consequence, one unit may be loaded beyond its efficiency while a companion unit receives only a part of its rated load. This condition does not allow optimum utilization of the gas-cleaning equipment or efficient operation of the cleaning systems.

Moreover, the arrangement of conduits in known multiple unit equipment is often such that poor gas distribution within the separate units causes uneven loading of the cleaning elements of the units and an accompanying deterioration in cleaning performance. In other words, the cross-sectional flow distribution within a given unit is not uniform, as it should be for optimum efficiency. Although a uniform cross-sectional distribution of the gas within a filter is essential to its efficient operation, it is difficult to achieve because of the relatively low gas velocity (on the order of five feet per second) at which filters are operated.

Another difficulty is operating gas-cleaning equipment on line with an industrial process has been that of performing routine maintenance, as well as desirable or necessary repairs, on the gas-cleaning equipment without the necessity of shutting down the industrial process being served by the equipment or discharging uncleaned gases into the atmosphere. For example, the smoke from a boiler may be discharged through a single gas-cleaning device, such as an electrostatic precipitator, for removing particulate matter in the smoke before it is discharged to the stack. If repair work or routine maintenance of the precipitator is required, the boiler has to be shut down. Usually, the precipitator is allowed to remain out of service until such time as the boiler is shut down, and dirty gas is discharged in the meantime.

In some instances, large boilers, furnaces and other combustion apparatuses are served by two or more precipitators in parallel with each other. In such multiple unit systems, smoke from the combustion apparatus typically is conducted through separate conduits or tunnels, each of which is equipped with a precipitator, and then the cleaned gases are discharged to a single stack. Here, if any of the filters require service, operation of the combustion apparatus generally will not be interrupted for such service and again only partial gas cleaning is affected.

SUMMARY OF THE INVENTION

The present invention provides for filtration means for use in removing contaminants such as particulates, pathogen, biologics and chemicals from a fluid system which comprises gases or vapors which can be easily maintained and installed.

In accordance with one embodiment of the invention there is provided a single filter unit for installation in a hospital system which provides a gas such as oxygen or anesthesia to patients from a central location. Accordingly, the filtration unit comprises an inlet at one end and an outlet at the other end. A chamber is provided between the outlet and inlet which holds a replaceable filter. At least one valve is provided to stop the flow of gases to replace the filter. A pressure gauge in association with the chamber is optionally provided to show a change in pressure which indicates that the filter should be replaced.

In accordance with another embodiment of the invention, there is provided a filtration system comprising multiple filter chambers having conduits with a common inlet and outlet for the gases or vapors entering and leaving the chambers. At the ends of each chamber is a valve means to close off the flow of gases or vapors into respective chambers. Each chamber is provided with a filter for removing selected contaminants. A pressure gauge is optionally associated with each chamber to show a loss in pressure to indicate the time to replace the filters. Each chamber can be selectively closed while the remaining opened chamber can be continued in operation and to maintain uniform distribution of gas or vapor.

It is an object of the invention to provide a filtration system with filter means which can be easily replaced.

It is another object of the invention to provide a means for filtering gases used in a hospital to treat patients.

It is another object of the invention to provide a filter system having a multiplicity of filters which clean gases or vapors and each filter can be shut down without it being necessary to shut down the entire system.

It is a further object of the invention to provide a filtration device for a soil vent stack in a plumbing system in residential, hospital, and all industrial applications.

It is yet another object of the invention to provide a filtration system having a multiplicity of filters wherein the gas distribution through each filter is uniform.

The invention will be better understood by reference to the drawings and the description of the preferred embodiments.

The drawings are exemplary only, and should not be construed as limiting the invention.

DESCRIPTION OF THE PREFERRED EMBODIMENTS

According to the present invention there is provided a filtration device which can be easily maintained and used in fluid systems to remove contaminants such as chemicals, particles, pathogens, biologics and the like, from gases, vapors and the like. The devices can also be used to regulate the flow of fluids.

Figure 1:
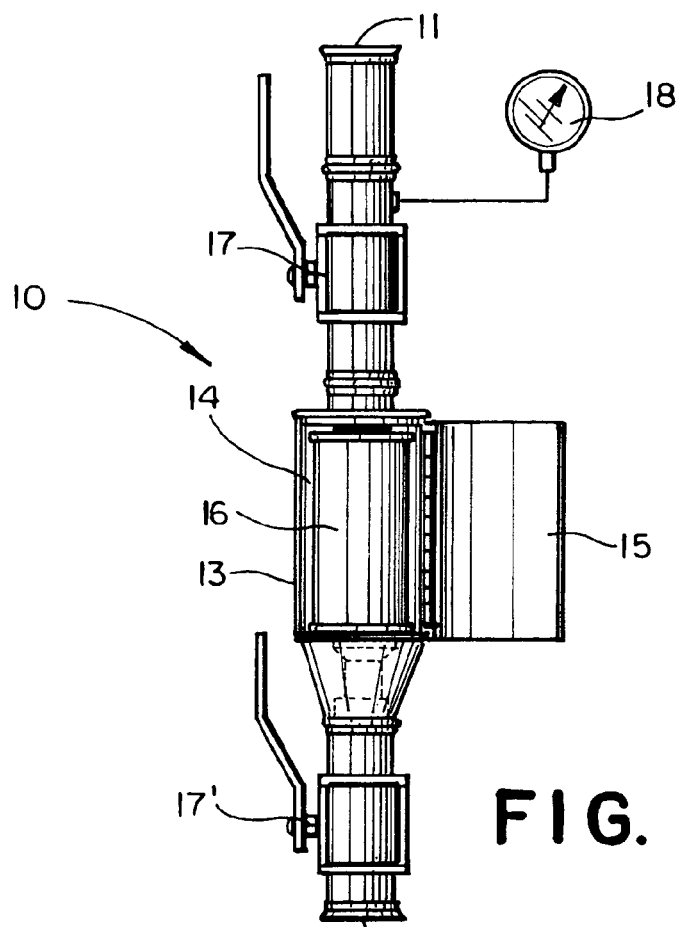
FIG. 1 is a front view of a single unit filtration device used in a gas delivery system of a hospital according to the invention.

According to one embodiment of the invention, a single unit filtration device can be installed in a gas delivery system in a hospital. Oxygen and anesthesia are commonly delivered from central areas to the patient and to the operating rooms by way of lines or pipes which when not in use can collect mold, debris, pathogens and the like, that can find their way to the patient. As seen in FIG. 1, a filtration device (10) can be installed in the system at a point prior to the gases reaching the patient. The filtration device (10) comprises a housing (13) with a chamber (14) in which a filter (16) is inserted. The device (10) may have a door (15) or can comprise a removable housing (13) which can be removed. On the outlet (11) of the device (10) is a valve (17) which can shut down the fluid flow or regulate the pressure in the chamber. On the inlet (12) of the device is another valve ($17^1$) which can also be used to regulate the pressure of the fluid in the chamber to control the fluid flow. Each of the valves (17, $17^1$) can be closed when removing the filter (16) to prevent the contaminants from entering the system. A gauge (18) associated with the chamber can be used to monitor the fluid pressure and to indicate by a pressure drop when the filter is clogged and should be changed.

According to another embodiment of the invention there is provided a novel and improved multiple unit system or arrangement of separate filter units that affords substantially uniform gas distribution among the units. Balanced loading of the multiple unit system is thus achieved, and improved particulate removal efficiency accordingly obtained. The improved system also enables any of such filter units to be isolated from the system and their enclosures to be opened to allow work to be performed, while permitting the source of gases being cleaned to remain in operation and affording effective gas cleaning during such maintenance or repair work. Moreover, the apparatus may be employed in a system carrying on any process involving the generation of gas contaminant that is removed by such filter units.

According to a further embodiment of the invention, there are provisions for the cleaning and sterilization of the filter element and housing prior to opening and or removal of the housing. This allows for the use of steam, chemical, gas or any other type of sanitation of the filter and/or housing. These provisions could also be employed to the system as a whole, if required or needed.

More particularly, an apparatus of the invention comprises the multiplicity of separately enclosed filter units that are separately connected to a common chamber that receives the gas to be cleaned from one or more sources. If appropriate, the gases may be released from the individual filter units directly to the atmosphere, or they may be conducted to one or more stacks, serving several or all of the units. Advantageously, however, the system is arranged such that the differential pressure across all of the filters is substantially equal so that the devices will share substantially equally the cleaning load of the gases being cleaned, thus ensuring uniform gas flow distribution among and within the several filters at all gas volumes. An important advantage of the invention is thereby realized, inasmuch as optimum utilization of each filter unit with correspondingly increased cleaning effectiveness.

Each of the filter units is provided with an appropriate valve or valve-type device for selectively cutting off communication from the chamber to the gas source so that the filter unit (housing) may be separated from the system for maintenance, repair or any other reason without making it necessary to shut down the entire system or the equipment which it serves. Another important advantage of the apparatus, according to the invention, resides in this feature, namely, the ability of maintaining continuous operation of a gas-cleaning system while permitting one, and possibly two or more, gas-cleaning units to be shut down for maintenance or repair. Also, a malfunction in one cleaning unit of the system does not reduce the effectiveness of cleaning below an acceptable level.

Figure 2:
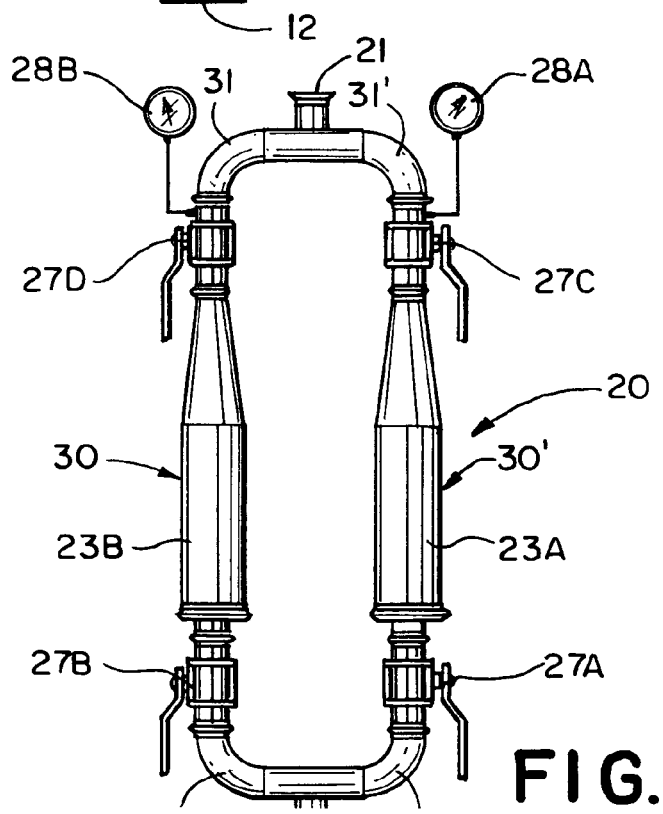
FIG. 2 illustrates a multi-filtration unit according to the invention.

As seen in FIG. 2, one of such multi-filter units comprises the device (20). The device (20) consists of a pair of parallel filter units (30, $30^1$). The units (30, $30^1$) have a common inlet (22) to which they are connected by lines or conduits, (29, $29^1$). There is a common outlet (21) to which the units (30, $30^1$) are connected by lines (31, $31^1$). Unit (30) comprises a housing (23B) with a chamber containing a filter (not shown). At each end of the housing (23B) are valves (27B, 27D) which can be used to control the flow of gases and completely shut off the unit for maintenance or to remove the unit. A gauge (28B) may be associated with unit (30) to monitor the gas pressure so as to have uniform flow.

Similarly, unit ($30^1$) comprises a housing (23A) with a chamber containing a filter (not shown). At each end of the housing (23A) are valves (27A, 27C) for regulating the gas flow. A gauge (28A) in line (31) monitors the gas pressure so as to have a uniform flow across the device (20).

Dependent upon the installation in which it is used, the device (20) can optionally contain cleaning and drain ports for cleaning in place. Also, cleaning can occur through the ports utilizing steam.

Dependent on its use the housing and pipe lines or conduits may be constructed of different types of steel, bronze/copper, plastic materials such as Teflon, polyvinyl chloride, polypropylene and the like.

Any commercially available pressure differential gauge may be used such as a Delta-P gauge with an optional switch.

The multi-unit device may contain one type of filter or may contain two or more types of filters arranged in series with each other. Each device will have filter arrangements in parallel in a system. Gas filters positioned and oriented in a symmetrical arrangement relative to the source from which they receive the gases, provides optimum conditions for uniform flow of gases and for even distribution to the filter units.

The device of FIG. 2 is suitable for use in connection with a soil vent stack of a plumbing system, combustion equipment or vents of biologic installations.

An advantage in having valve means at both the outlet and inlet is that uniform distribution of gas or vapors can continue when the housing in the multi-units are not spaced equidistant.

The filters can contain cationic, or anionic ion exchange material, charcoal, sand, bacterial, HEPA filters, and the like depending upon the system to be filtered. Filter media can be poly glass, membrane, PTFE membrane, or expanded PTFE membrane or any other available media depending on the use.

What is claimed is:

1. A filtration apparatus for use in combination with a soil vent stack to be cleaned which comprises:
    at least one housing having an inner chamber; an inlet and an outlet;
    HEPA filter in said at least one chamber;
    an outlet portion for said apparatus for discharge of a gas or vapor from said filter means and chamber associated with said at least one housing;
    an inlet portion of said apparatus associated with an inlet of said at least one housing for receiving said gas or vapor to be passed through said chamber and filter means;
    first valve means associated with the inlet portion of said at least one housing to selectively close off the inlet to said at least one housing and to control the flow of said gas or vapor;
    second valve means associated with the outlet portion of said at least one housing to selectively close off the outlet of said at least one housing and to control the flow of said gas or vapor.

2. The filtration apparatus of claim 1 including a pressure differential gauge associated with said at least one housing.

3. The filtration apparatus of claim 1 comprising a single housing having an inlet portion at one end and an outlet portion at the other end, a valve means at said inlet portion and said outlet portion, and a pressure differential gauge associated with said housing.

4. The filtration apparatus of claim 3 in association with a line having a source of gas.

5. The filtration apparatus of claim 1 comprising a multiplicity of parallel housings, each housing having a chamber;
    HEPA filter means in each chamber;
    each housing having an inlet for receiving a gas or vapor to be cleaned and an outlet for discharging the gas or vapor after cleaning,
    said apparatus having an inlet at one end for receiving a gas or vapor to be cleaned and an outlet at the other end for discharging the cleaned vapor or gas;
    substantially identical outlet conduits communicating with the outlets of each of said housings and the outlet of said apparatus;
    valve means in each of said inlet conduits for selectively closing off said inlet conduit to preclude gas inflow to the respective chamber and to regulate the flow of gas into the respective chambers;
    valve means in each of said outlet conduits for selectively closing off said outlet conduit to preclude gas inflow so that the gas or vapor will be processed through the open chambers, and
    a differential pressure gauge associated with each of said housings.

6. The filtration apparatus of claim 5 comprising two spaced apart parallel housings.

7. In combination with a soil vent stack, a filtration apparatus for use in a system containing a gas or vapor to be cleaned which comprises;
    a pair of parallel cylindrical housings having an inner chamber for housing a HEPA filter;
    said apparatus having an outlet portion for discharge of a gas or vapor from said chambers, and an inlet portion for receiving a gas or vapor to be cleaned;
    substantially identical inlet conduits communicating with the inlet of said apparatus;
    substantially identical outlet conduits communicating with the outlets of each of said housings and the outlet of said apparatus;
    valve means in each of said inlet conduits for selectively closing off said inlet conduit to preclude gas inflow to the respective chamber;
    valve means in each of said outlet conduits for selectively closing of said outlet to preclude gas inflow so that the gas or vapor will be processed through the open chamber, and
    differential pressure gauge associated with the conduits of each housing.

\* \* \* \* \*